(12) United States Patent
Fujimori et al.

(10) Patent No.: US 10,623,684 B2
(45) Date of Patent: Apr. 14, 2020

(54) DISPLAY DEVICE, AND METHOD OF CONTROLLING DISPLAY DEVICE

(71) Applicant: SEIKO EPSON CORPORATION, Tokyo (JP)

(72) Inventors: Toshiki Fujimori, Chino (JP); Yoshiteru Uchiyama, Suwa (JP); Takahiro Ano, Matsumoto (JP); Toru Karasawa, Minowa-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/956,216

(22) Filed: Apr. 18, 2018

(65) Prior Publication Data
US 2018/0316888 A1 Nov. 1, 2018

(30) Foreign Application Priority Data
Apr. 27, 2017 (JP) .................................. 2017-088371

(51) Int. Cl.
| | | |
|---|---|---|
| G06F 3/0484 | (2013.01) | |
| H04N 5/74 | (2006.01) | |
| H04N 9/31 | (2006.01) | |
| G09G 5/00 | (2006.01) | |
| G06F 3/0489 | (2013.01) | |
| G03B 21/14 | (2006.01) | |

(52) U.S. Cl.
CPC ............. *H04N 5/74* (2013.01); *G06F 3/0484* (2013.01); *G06F 3/04897* (2013.01); *G09G 5/00* (2013.01); *G09G 5/001* (2013.01); *H04N 9/31* (2013.01); *H04N 9/3179* (2013.01); *G03B 21/14* (2013.01); *G09G 2320/08* (2013.01); *G09G 2354/00* (2013.01)

(58) Field of Classification Search
CPC ...................................................... G06F 3/0484
USPC ......................................................... 715/716
See application file for complete search history.

(56) References Cited

U.S. PATENT DOCUMENTS

| | | | |
|---|---|---|---|
| 8,479,102 B2 | 7/2013 | Son et al. | |
| 8,745,272 B2 * | 6/2014 | Casalaina | ............... H04L 41/22 709/248 |

(Continued)

FOREIGN PATENT DOCUMENTS

| | | |
|---|---|---|
| JP | H10-20985 A | 1/1998 |
| JP | 2005-156747 A | 6/2005 |

(Continued)

*Primary Examiner* — William D Titcomb
(74) *Attorney, Agent, or Firm* — Oliff PLC

(57) ABSTRACT

A display device includes an input section to which image information is externally input, a display section adapted to display an image based on the image information on a display surface, and a control section adapted to control the display device based on setting information related to an operation of the display device to make the display section display the image, and change the setting information from first setting information to second setting information in accordance with an instruction for changing the setting information. In the case in which the image information is not input to the input section for a first time period after the control section changes the setting information from the first setting information to the second setting information, the control section changes the setting information from the second setting information to the first setting information.

9 Claims, 9 Drawing Sheets

(56) References Cited

U.S. PATENT DOCUMENTS

| | | | |
|---|---|---|---|
| 9,092,108 B2 | 7/2015 | Son et al. | |
| 2007/0271522 A1 | 11/2007 | Son et al. | |
| 2011/0225232 A1* | 9/2011 | Casalaina | H04L 41/22 |
| | | | 709/203 |
| 2013/0159872 A1 | 6/2013 | Son et al. | |
| 2013/0275873 A1* | 10/2013 | Shaw | G01S 3/8006 |
| | | | 715/716 |
| 2014/0189513 A1* | 7/2014 | Dua | H04M 1/7253 |
| | | | 715/716 |
| 2014/0258863 A1* | 9/2014 | Woods | G06F 3/0484 |
| | | | 715/716 |
| 2014/0344685 A1* | 11/2014 | Lehtiniemi | G06F 3/0484 |
| | | | 715/716 |
| 2015/0331602 A1 | 11/2015 | Son et al. | |

FOREIGN PATENT DOCUMENTS

| | | |
|---|---|---|
| JP | 2007-317187 A | 12/2007 |
| JP | 2008-219468 A | 9/2008 |
| JP | 2009-122752 A | 6/2009 |
| JP | 4916918 B2 | 4/2012 |
| JP | 5044283 B2 | 10/2012 |
| JP | 2016-29550 A | 3/2016 |
| JP | 2016-103810 A | 6/2016 |

* cited by examiner

| ITEM | FIRST SETTING INFORMATION (REFERENCE VALUE) | SECOND SETTING INFORMATION |
|---|---|---|
| SOUND VOLUME | AA | BB |
| COLOR MODE | CC | DD |
| KEYSTONE DISTORTION CORRECTION VALUE | EE | FF |
| IP ADDRESS | GG | – |

DISPLAY DEVICE, AND METHOD OF CONTROLLING DISPLAY DEVICE

CROSS-REFERENCE

The entire disclosure of Japanese Patent Application No. 2017-088371, filed Apr. 27, 2017, is expressly incorporated by reference herein.

BACKGROUND

1. Technical Field

The present invention relates to a display device and a method of controlling the display device.

2. Related Art

In the display device such as a projector, setting values such as tint and contrast of an image are set in advance to reference values assumed to be preferred by many users in many cases. The setting values are changed by a user in accordance with the viewing circumstances and the preference of the user in some cases. In JP-A-2016-29550 (Document 1), there is described a technology of generating statistical values related to changes of the setting values of the user interface (UI) for each of user types, and automatically changing the setting values of the UI in accordance with the statistical values.

In the case of automatically changing all of the setting values of the display device using the technology described in Document 1, there arises a necessity for generating the statistical values with respect to all of the setting values for each of the user types. Therefore, it is conceivable to automatically update only some of the setting values using the statistical values.

However, there is a possibility that the setting values not automatically updated are changed while the plurality of users takes turns at using the display device even though such setting values are set to the reference values at the beginning. Therefore, it is necessary for the user of the display device to start using the display device using the setting values having been changed in accordance with the preference of another user or the like.

SUMMARY

An advantage of some aspects of the invention is to provide a technology for preventing the user from starting using a display device using setting values having been changed by another user.

A display device according to an aspect of the invention includes an input section to which image information is externally input, a display section adapted to display an image based on the image information on a display surface, and a control section adapted to control the display device based on setting information related to an operation of the display device to make the display section display the image, and change the setting information from first setting information to second setting information in accordance with an instruction for changing the setting information, and in a case in which the image information is not input to the input section for a first time period after the control section changes the setting information from the first setting information to the second setting information, the control section changes the setting information from the second setting information to the first setting information.

In the case in which the user of the display device is switched, there is a possibility that the image information to be input to the input section of the display device is switched. Further, when switching the image information, there occurs the time period during which the image information is not input to the input section.

According to the aspect of the invention, in the case in which the image information is not input to the input section for the first time period, the setting information is changed from the second setting information having been changed to the first setting information not having been changed. Therefore, it becomes possible to change the setting information from the second setting information having been changed to the first setting information not having been changed in the case in which the input of the image information to the input section has stopped due to the switching between the users. Therefore, it is possible to prevent the user from starting using the display device using the setting information (the second setting information) having been changed by other users.

In the display device according to the aspect of the invention described above, it is desirable that there is further included a changing section adapted to change the first setting information in a case in which a frequency of changing the setting information from the first setting information to information different from the first setting information exceeds a threshold value.

In the case in which the frequency of changing the setting information from the first setting information to the information different from the first setting information is high, there is a possibility that the first setting information is not appropriate. Therefore, according to the aspect of the invention with the configuration described above, it becomes possible to automatically change the first setting information which can be inappropriate.

In the display device according to the aspect of the invention described above, it is desirable that the changing section changes the first setting information based on the information different from the first setting information.

According to the aspect of the invention with this configuration, since the first setting information is changed based on the information having been changed, the first setting information becomes apt to be changed to appropriate information.

In the display device according to the aspect of the invention described above, it is desirable that the control section makes the display section display a first setting screen for setting the first setting information and a second setting screen for setting the second setting information.

According to the aspect of the invention with this configuration, since the screen for setting the first setting information and the screen for setting the second setting information are different from each other, it becomes possible to prevent for the first setting information and the second setting information from being confused with each other when setting the first setting information and the second setting information.

In the display device according to the aspect of the invention described above, it is desirable that the first setting screen is a screen including a partial image for setting the first setting information with respect to a first setting item and a partial image for setting the first setting information with respect to a second setting item, and the second setting screen is a screen including a partial image for setting the second setting information with respect to the first setting item, and not including a partial image for setting the second setting information with respect to the second setting item.

According to the aspect of the invention with this configuration, it becomes possible to provide a setting item the first setting information of which is set, and the second setting information of which is not set. Therefore, it becomes possible to provide the setting item which is not changed from the first setting information to the second setting information.

In the display device according to the aspect of the invention described above, it is desirable that the display section displays a first image on the display surface in a case in which an operation of changing the first setting information is performed in the second setting screen.

According to the aspect of the invention with this configuration, since the first image is displayed when a special operation of changing the first setting information in the second setting screen is performed, for example, it becomes possible to give caution to the user with the display of the first image.

In the display device according to the aspect of the invention described above, it is desirable that in a case in which the image information is not input to the input section for the first time period after the control section changes the setting information with respect to a first item and the setting information with respect to a second item from the first setting information to the second setting information, the control section changes the setting information with respect to the second item from the second setting information to the first setting information without changing the setting information with respect to the first item from the second setting information to the first setting information, and in a case in which the image information is not input to the input section for a second time period after the control section changes the setting information with respect to the second item from the second setting information to the first setting information without changing the setting information with respect to the first item from the second setting information to the first setting information, the control section changes the setting information with respect to the first item from the second setting information to the first setting information.

In the case in which the time period during which the image information is not input to the input section is long, there arises a possibility that, for example, the display device is moved to change the installation condition of the display device. Therefore, it is desired that the longer the time period in which the image information is not input to the input section is, the more items of the setting information are restored to the information not having been changed.

According to the aspect of the invention with the configuration described above, it becomes possible that the longer the time period in which the image information is not input to the input section is, the more items of the setting information are restored to the information not having been changed.

In the display device according to the aspect of the invention described above, it is desirable that in a case in which the image information is not input to the input section for the first time period after the control section changes the setting information from the first setting information to the second setting information, the control section changes the setting information from the second setting information to the first setting information in a case in which an operation mode of the display device is a first mode, and the control section keeps the setting information in the second setting information in a case in which the operation mode is a second mode.

According to the aspect of the invention with this configuration, it becomes possible to switch whether the setting information is changed from the second setting information to the first setting information, or the setting information is kept in the second setting information in accordance with the operation mode.

A method of controlling a display device according to an aspect of the invention is a method of controlling a display device having an input section to which image information is externally input, the method including displaying an image based on the image information on a display surface, controlling the display device based on setting information related to an operation of the display device to display the image on the display surface, changing the setting information from the first setting information to the second setting information in accordance with an instruction of changing the setting information, and changing the setting information from the second setting information to the first setting information in a case in which the image information is not input to the input section for a first time period after changing the setting information from the first setting information to the second setting information.

According to the aspect of the invention, it is possible to prevent the user from starting using the display device using the setting information having been changed by other users.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Figure 1:
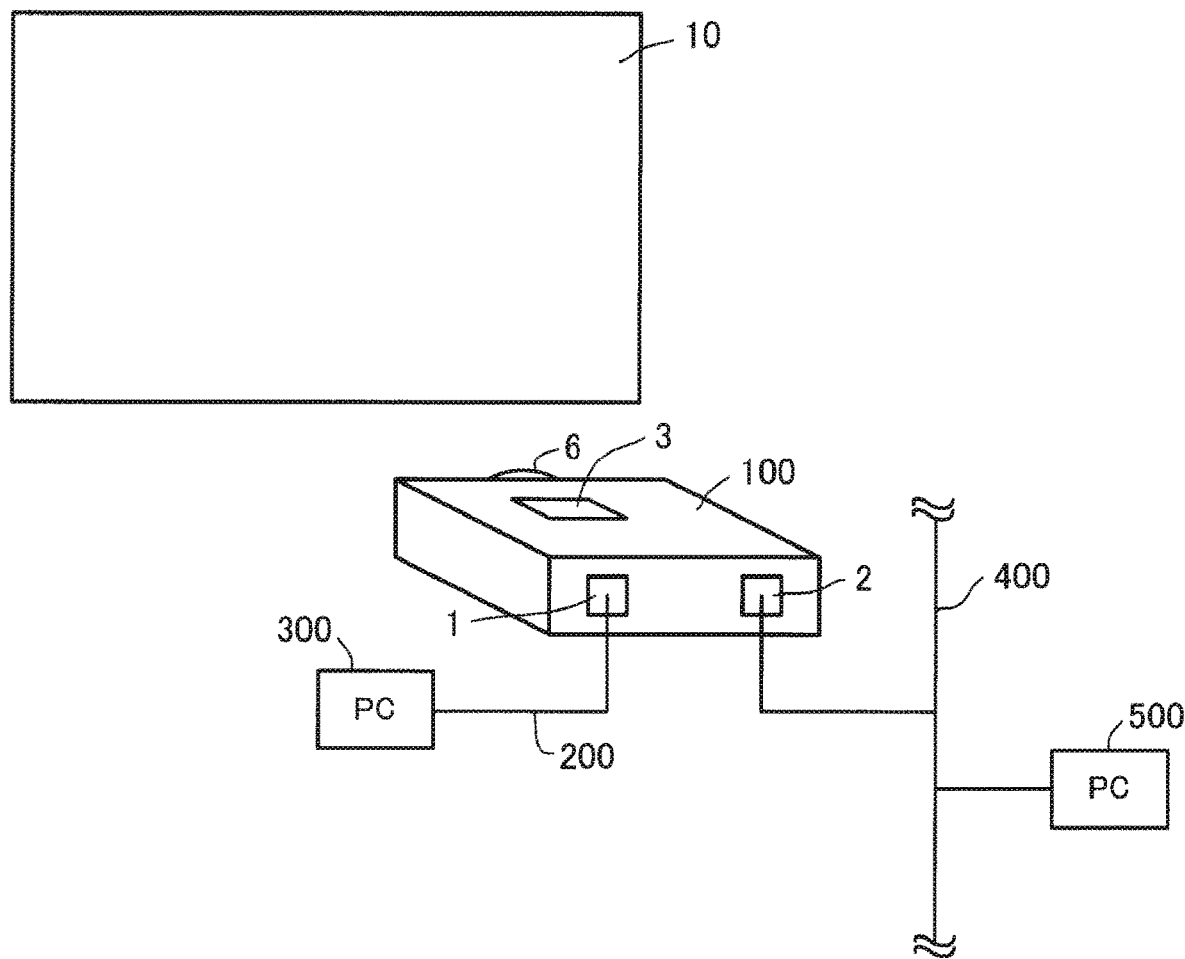
FIG. 1 is a diagram showing a projector as an example of a display device according to a first embodiment of the invention.

Hereinafter, a first embodiment of the invention will be described with reference to the accompanying drawings. It should be noted that in the drawings, the size and the scale of each of the constituents are arbitrarily different from actual ones. Further, the embodiment described hereinafter is a preferred specific example of the invention. Therefore, the present embodiment is provided with a variety of technically preferable limitations. However, the scope or the spirit of the invention is not limited to the embodiment unless there is any particular description of limiting the invention in the following description.

Embodiment

FIG. 1 is a diagram showing a projector 100 as an example of a display device according to the first embodiment of the invention. The projector 100 includes an input terminal 1 and a communication section 2. The input terminal 1 is an example of an input section. The communication section 2 is another example of the input section.

To the input terminal 1, there is input image information A from a personal computer (PC) 300 via a communication cable 200. The communication cable 200 can be attached to and detached from the input terminal 1. To the communication section 2, there is input image information B from a PC 500 via a communication line 400 such as a local area network (LAN). The communication line 400 can be attached to and detached from the communication section 2. The supply source of the image information is not limited to the PC, but can arbitrarily be changed. The image information can be accompanied by sound information. Hereinafter, the image information A and the image information B are each assumed to be accompanied by sound information.

The projector 100 switches the image information (hereinafter referred to as "display target image information") used for the display between the image information A and the image information B in accordance with a switching instruction (an instruction for switching the input source of the image information to thereby change the image to be displayed by the projector 100) received by the reception section 3 described later from the user (hereinafter simply referred to as a "user") of the projector 100.

For example, when the projector 100 receives the switching instruction of switching the input source of the display target image information to the communication section 2 in the situation in which the image information A input from the input terminal 1 is the display target image information, the projector 100 switches the display target image information from the image information A to the image information B. Then, the projector 100 projects the image based on the display target image information (the image information B) from the projection section 6 to the projection surface 10 to display the image. The projection surface 10 is an example of a display surface.

The projector 100 operates based on the setting information (e.g., the setting information related to the luminance of the image) related to the operation of the projector 100. The projector 100 changes the setting information in accordance with the change instruction received by the reception section 3 from the user. The change instruction is an example of an instruction for changing the setting information.

In the case in which the display target image information is not input for a first time period T1 after changing the setting information in accordance with the change instruction, the projector 100 restores the setting information to the previous setting information not having been changed.

For example, the first time period T1 is set for detecting the fact that the communication cable connected to the input terminal 1 has been switched due to the change in the user, and for detecting the fact that the communication line 400 is disconnected from the communication section 2 due to the change in the user.

There is a possibility that the image information A instantaneously becomes in a no-signal state in accordance with the connection state (e.g., slack in the connection section between the input terminal 1 and the connection cable 200) between the input terminal 1 and the communication cable 200, and switching of the resolution of the image information A. Therefore, as the first time period T1, there is set the time (e.g., several seconds) longer than such an instantaneous no-signal state and shorter than the time assumed to be necessary for the user to switch the communication cable. For example, a period of three seconds is used as the first time period T1.

Figure 2:
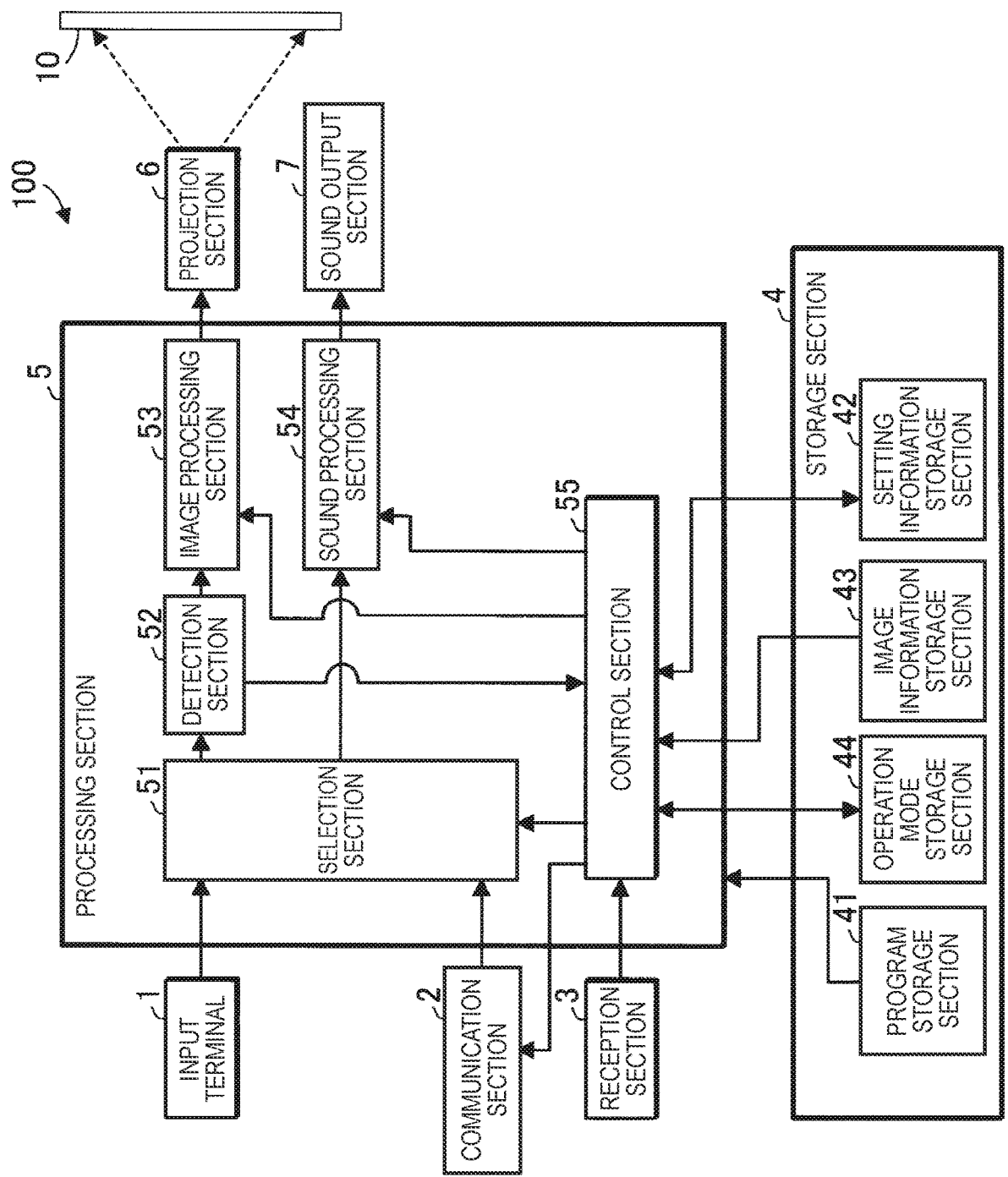
FIG. 2 is a diagram showing an example of the projector.

FIG. 2 is a diagram showing an example of the projector 100. The projector 100 includes the reception section 3, a storage section 4, a processing section 5, the projection section 6, and a sound output section 7 in addition to the input terminal 1 and the communication section 2 described above.

The reception section 3 corresponds to, for example, a variety of operation buttons, operation keys, a touch panel, or the like for receiving input (e.g., the switching instruction and the change instruction) from the user and so on. The reception section 3 can also be a remote controller for transmitting the input received from the user wirelessly or with wire, and so on. In such a case, the projector 100 is provided with a receiver section for receiving the information transmitted by the remote controller. It should be noted that the remote controller is provided with a variety of operation buttons, operation keys, a touch panel or the like for receiving the input from the user.

The storage section 4 is a computer-readable recording medium. The storage section 4 includes a program storage section 41, a setting information storage section 42, an image information storage section 43, and an operation mode storage section 44.

The program storage section 41 stores a program for defining the operation of the projector 100.

Figures 3, 4:
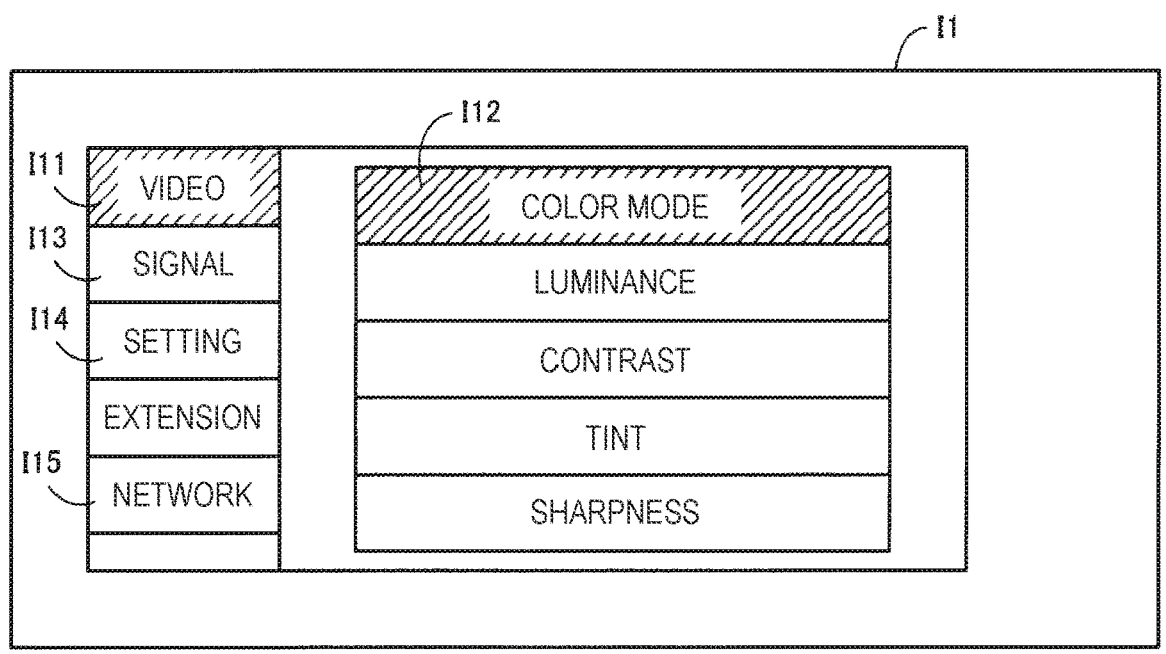
FIG. 3 is a diagram showing an example of setting information stored in a setting information storage section.
FIG. 4 is a diagram showing an example of a first setting screen.

The setting information storage section 42 stores a variety of types of setting information related to the operation of the projector 100. FIG. 3 is a diagram showing an example of the setting information stored in the setting information storage section 42. The setting information storage section 42 stores a sound volume, a color mode, a keystone distortion correction value, and an Internet protocol (IP) address as items (setting items) of the setting information. It should be noted that the items (setting items) of the setting information are not limited to the sound volume, the color mode, the keystone distortion correction value, and the IP address, but can arbitrarily be changed.

The setting information storage section 42 stores first setting information functioning as reference values with respect to the respective items of the sound volume, the color mode, the keystone distortion correction value, and the IP address. The first setting information is set by, for example, an administrator (hereinafter simply referred to as an "administrator") of the projector 100. The first setting information is set to the information (value) assumed to be preferred by many users. The first setting information is set with respect to all of the items of the sound volume, the color mode, the keystone distortion correction value, and the IP address.

The setting information storage section 42 stores second setting information with respect to the respective items of the sound volume, the color mode, and the keystone distortion correction value. The second setting information is set by, for example, the user. The items for which the second setting information is set can arbitrarily be changed, and are required to be at least one of, for example, the sound volume, the color mode, and the keystone distortion correction value.

The image information storage section 43 stores a variety of types of image information (e.g., first setting screen information representing a first setting screen for setting the first setting information, and second setting screen information representing a second setting screen for setting the second setting information).

FIG. 4 is a diagram showing an example of the first setting screen I1. The first setting screen I1 functions as a graphical user interface (GUI) for the administrator. The administrator operates the first setting screen I1 using the reception section 3 to thereby set the first setting information.

For example, the administrator operates a video button I11 using the reception section 3 to thereby set the first setting information (denoted by "CC" in FIG. 3) of the color mode I12. The administrator operates a signal button I13 using the reception section 3 to thereby set the first setting information (denoted by "EE" in FIG. 3) of the keystone distortion correction value. The administrator operates a setting button I14 using the reception section 3 to thereby set the first setting information (denoted by "AA" in FIG. 3) of the sound volume. The administrator operates a network button I15 using the reception section 3 to thereby set the first setting information (denoted by "GG" in FIG. 3) of the IP address.

Here, the color mode, the keystone distortion correction value, and the sound volume are each an example of a first setting item. The video button I11, the signal button I13, and the setting button I14 are each an example of a partial image for setting the first setting information with respect to the first setting item. Further, the IP address is an example of a second setting item. The network button I15 is an example of a partial image for setting the first setting information with respect to the second setting item.

Figure 5:
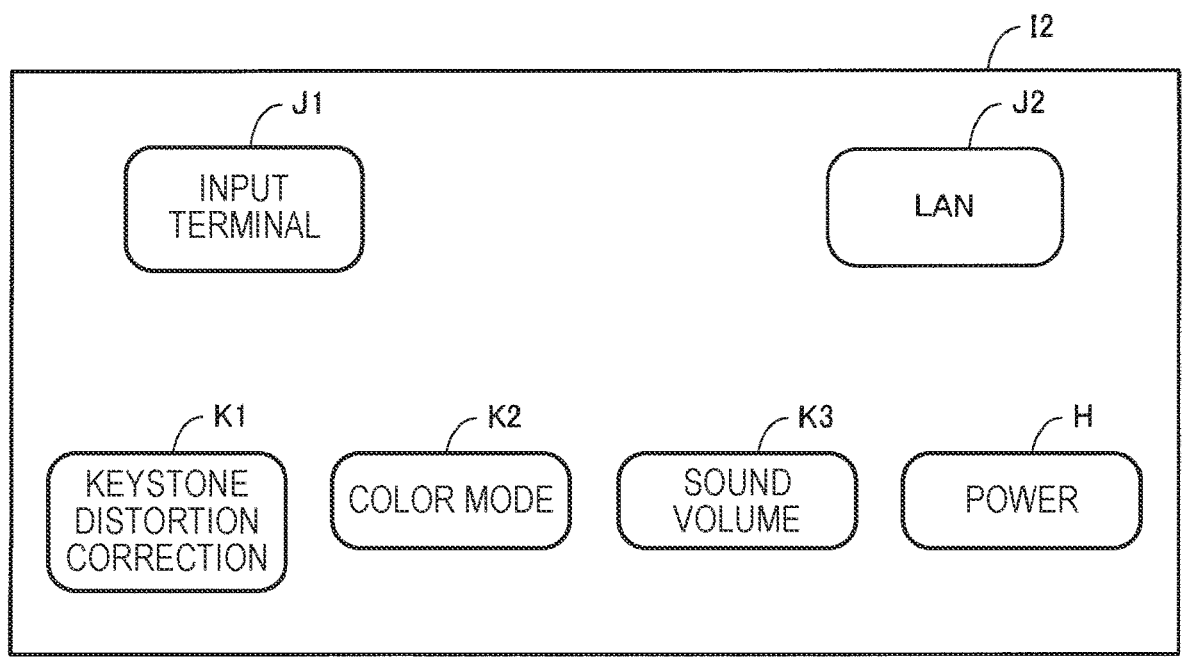
FIG. 5 is a diagram showing an example of a second setting screen.

FIG. 5 is a diagram showing an example of the second setting screen I2. The second setting screen I2 functions as a GUI for the user. The user operates the second setting screen I2 using the reception section 3 to thereby set the second setting information.

The user operates a keystone distortion correction button K1 using the reception section 3 to thereby set the second setting information (denoted by "FF" in FIG. 3) of the keystone distortion correction value. The user operates a color mode button K2 using the reception section 3 to thereby set the second setting information (denoted by "DD" in FIG. 3) of the color mode. The user operates a sound volume button K3 using the reception section 3 to thereby set the second setting information (denoted by "BB" in FIG. 3) of the sound volume.

Here, the keystone distortion correction button K1, the color mode button K2, and the sound volume button K3 are each an example of a partial image for setting the second setting information with respect to the first setting item. It should be noted that in the second setting screen I2, it is not possible to change the IP address. Moreover, the second setting screen I2 does not include a partial image for setting the second setting information with respect to the second setting item.

Further, the user operates a selection button J1 corresponding to the input terminal 1 using the reception section 3 to thereby input the switching instruction for switching the input source of the display target image information to the input terminal 1. Further, the user operates a selection button J2 corresponding to the communication section 2 (LAN) using the reception section 3 to thereby input the switching instruction for switching the input source of the display target image information to the communication section 2.

Going back to FIG. 2, the operation mode storage section 44 stores an operation mode of the projector 100. The projector 100 has a "sharing mode" in which a plurality of users shares the projector 100, and an "exclusive mode" in which one user exclusively uses the projector 100 as the operation modes. The processing section 5 (specifically, a control section 55 described later) sets the operation mode in accordance with the operation mode setting instruction received by the reception section 3. The "sharing mode" is an example of a first mode, and the "exclusive mode" is an example of a second mode.

The processing section 5 is a computer such as a central processing unit (CPU). The processing section 5 retrieves and then executes the program stored in the program storage section 41 to thereby realize a selection section 51, a detection section 52, an image processing section 53, a sound processing section 54 and the control section 55. It should be noted that it is also possible to realize the selection section 51, the detection section 52, the image processing section 53, the sound processing section 54, and the control section 55 with a single CPU (or semiconductor chip), or to realize the selection section 51, the detection section 52, the image processing section 53, the sound processing section 54, and the control section 55 using a plurality of CPUs (or semiconductor chips).

The selection section 51 selects the display target image information from the image information A input from the input terminal 1 and the image information B input from the communication section 2.

Since the image information A and B are each accompanied by the sound information as described above, the display target image information is also accompanied by the sound information. The selection section 51 outputs the sound information accompanying the display target image information to the sound processing section 54, and outputs the display target image information with the sound information removed to the image processing section 53 via the detection section 52.

The detection section 52 detects presence or absence of the display target image information.

When the communication cable 200 is removed from the input terminal 1 in the situation in which the image information A input to the input terminal 1 via the communication cable 200 is selected as the display target image information, output of the display target image information (the image information A) from the selection section 51 stops. Further, when the communication line 400 is removed from the communication section 2 in the situation in which the image information B input to the communication section 2 via the communication line 400 is selected as the display target image information, output of the display target image information (the image information B) from the selection section 51 stops.

The detection section 52 detects the state, in which the display target image information is not output from the selection section 51, to thereby detect the state in which the display target image information is not input to the input terminal 1 and the communication section 2. The detection section 52 informs the control section 55 of the detection result.

The image processing section 53 performs image processing (e.g., a keystone distortion correction, a luminance adjustment, a contrast adjustment, a tint adjustment, and a sharpness adjustment) on the display target image information to generate an image signal. In the present embodiment, the combination of the luminance adjustment, the contrast adjustment, the tint adjustment, and the sharpness adjustment is described as a "color mode."

The sound processing section 54 controls the sound volume with respect to the sound information to generate a sound signal.

The control section 55 controls the projector 100.

For example, the control section 55 makes the projection section 6 project to display the first setting screen I1 corresponding to the first setting screen information in accordance with the operation by the user to the reception section 3. Further, the control section 55 makes the projection section 6 project to display the second setting screen I2 corresponding to the second setting screen information in accordance with the operation by the user to the reception section 3.

Further, the control section 55 stores the first setting information received by the reception section 3 via the first setting screen I1 into the setting information storage section 42. Further, the control section 55 stores the second setting information received by the reception section 3 via the second setting screen I2 into the setting information storage section 42.

The control section 55 sets the setting information to each of the image processing section 53, the sound processing section 54, and the communication section 2 using the first setting information stored in the setting information storage section 42.

The control section 55 changes the setting information in the image processing section 53 and the sound processing section 54 from the first setting information to the second setting information in accordance with the change instruction.

Further, the control section 55 determines whether or not the display target image information is input to neither the input terminal 1 nor the communication section 2 based on the detection result of the detection section 52. In the case in which the display target image information is input to neither the input terminal 1 nor the communication section 2 during the first time period T1, in the situation in which the setting information has been changed from the first setting information to the second setting information, the control section 55 changes the setting information from the second setting information to the first setting information.

Further, the control section 55 switches the display target image information in accordance with the switching instruction.

The projection section 6 is an example of a display section. The display section does not include the projection surface 10. The projection section 6 projects to display the image corresponding to the image signal output by the image processing section 53 on the projection surface 10.

Figure 6:
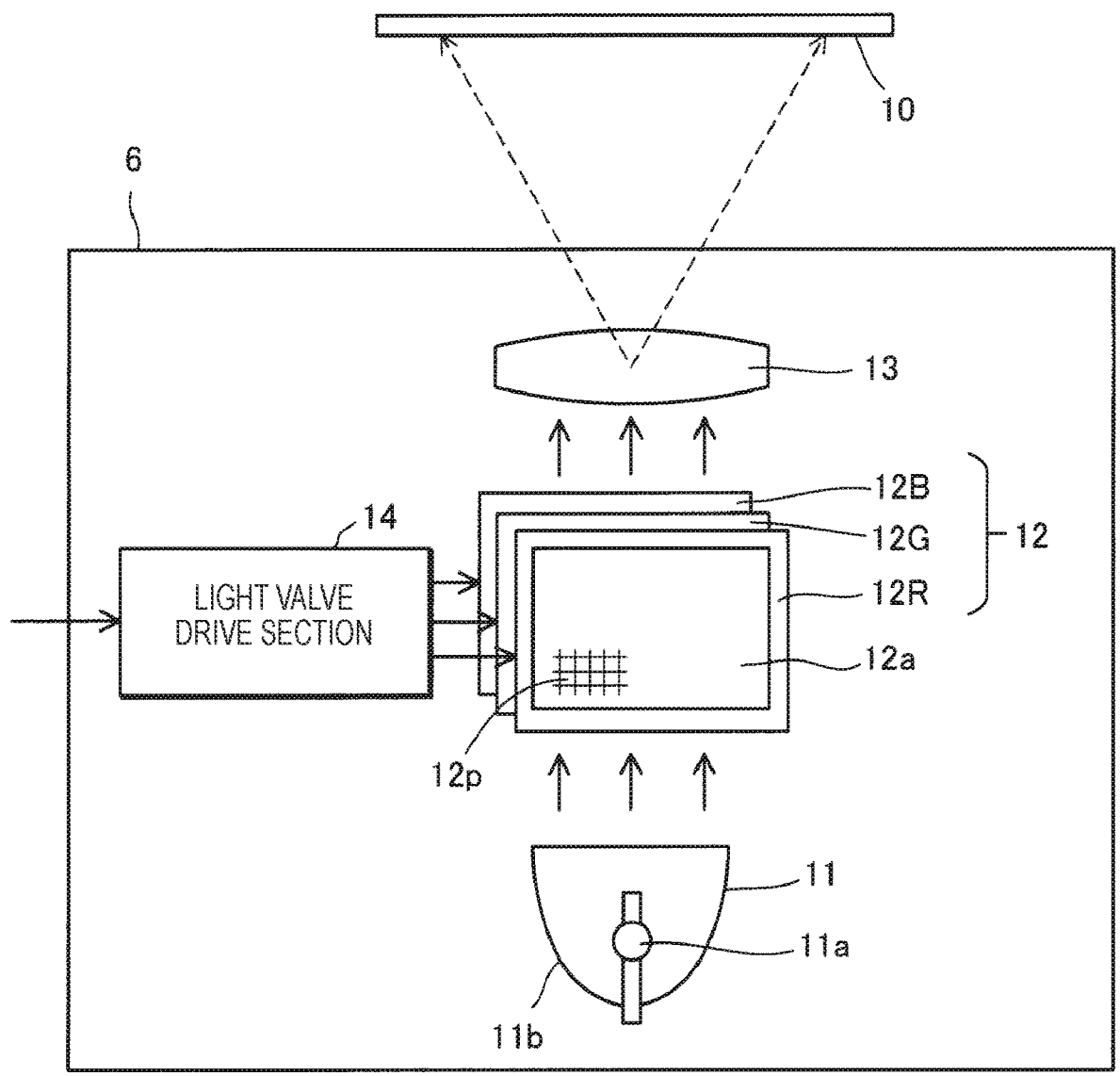
FIG. 6 is a diagram showing an example of a projection section.

FIG. 6 is a diagram showing an example of the projection section 6. The projection section 6 includes a light source 11, three liquid crystal light valves 12 (12R, 12G, and 12B) as an example of a light modulation device, a projection lens 13 as an example of a projection optical system, a light valve drive section 14, and so on. The projection section 6 modulates the light emitted from the light source 11 with the liquid crystal light valves 12 to form the projection image (image light), and then projects the projection image from the projection lens 13 in an enlarged manner.

The light source 11 includes a light source section 11a formed of a xenon lamp, a super high-pressure mercury lamp, an LED (light emitting diode), a laser source, or the like, and a reflector 11b for reducing a variation in direction of the light emitted by the light source section 11a. The light emitted from the light source 11 is reduced in variation of the luminance distribution by an integrator optical system not shown, and is then separated by a color separation optical system not shown into colored light components of red (R), green (G), and blue (B) as three primary colors of light. The colored light components of R, G, and B respectively enter the liquid crystal light valves 12R, 12G, and 12B.

The liquid crystal light valves 12 are each formed of a liquid crystal panel having a liquid crystal material encapsulated between a pair of transparent substrates, and so on. The liquid crystal light valves 12 are each provided with a pixel area 12a having a rectangular shape and formed of a plurality of pixels 12p arranged in a matrix. In each of the liquid crystal light valves 12, it is possible to apply a drive voltage to the liquid crystal for each of the pixels 12p. When the light valve drive section 14 applies the drive voltages corresponding to the image signal input from the image processing section 53 to the respective pixels 12p, each of the pixels 12p is set to have a light transmittance corresponding to the image signal. Therefore, the light having been emitted from the light source 11 is transmitted through the pixel area 12a to thereby be modulated, and thus, the image corresponding to the image signal is formed for each colored light.

The images of the respective colored light are combined by a color combining optical system not shown for each of the pixels 12p, and thus, the projection image light (the projection image) as color image light (a color image) is generated. The projection image light is projected by the projection lens 13 on the projection surface 10 in an enlarged manner.

Going back to FIG. 2, the sound output section 7 is a speaker, and outputs the sound corresponding to the sound signal output by the sound processing section 54.

Then, the operation will be described.

For example, when the projector 100 starts the operation in the situation in which the setting information storage section 42 stores the first setting information but does not store the second setting information, the control section 55 sets the first setting information (see FIG. 3) stored in the setting information storage section 42 to the image processing section 53, the sound processing section 54, and the communication section 2 as the setting information.

Specifically, the control section 55 sets the first setting information AA of the sound volume to the sound processing section 54 as the setting information of the sound volume. Further, the control section 55 sets the first setting information CC of the color mode to the image processing section 53 as the setting information of the color mode, and sets the first setting information EE of the keystone distortion correction value to the image processing section 53 as the setting information of the keystone distortion correction value. Further, the control section 55 sets the first setting information GG of the IP address to the communication section 2 as the setting information of the IP address.

In this situation, when, for example, the selection button J1 is operated in the second setting screen I2, the control section 55 makes the selection section 51 select the image information A as the display target image information. Subsequently, the selection section 51 outputs the sound information accompanying the image information A to the sound processing section 54, and outputs the image information A with the sound information removed to the image processing section 53 via the detection section 52.

The sound processing section 54 performs the process corresponding to the first setting information AA related to the sound volume on the sound information received from the selection section 51 to generate the sound signal, and the sound output section 7 outputs the sound corresponding to the sound signal.

The image processing section 53 performs the image processing corresponding to the first setting information CC related to the color mode and the first setting information EE related to the keystone distortion correction value on the image information A to generate the image signal, and the projection section 6 projects the image corresponding to the image signal.

Subsequently, when the user operates the reception section 3 to input the change instruction for changing the first setting information of a certain item to the second setting information through the second setting screen I2, the control section 55 stores the second setting information of that item to the setting information storage section 42. Hereinafter, for the sake of simplification of the explanation, it is assumed that the second setting information DD of the color mode is stored to the setting information storage section 42.

In this case, the control section 55 changes the setting information of the color mode set in the image processing section 53 from the first setting information CC to the second setting information DD. Therefore, the image processing section 53 performs the image processing on the image information A using the first setting information EE as the setting information with respect to the keystone distortion correction value and using the second setting information DD as the setting information with respect to the color mode to thereby generate the image signal, and then the projection section 6 projects the image corresponding to the image signal. In other words, the control section 55 changes the setting information of the color mode set in the image processing section 53 from the first setting information CC to the second setting information DD to thereby make the projection section 6 display the image based on the image information A on the projection surface 10. The state on this occasion is hereinafter referred to as a "first state."

Figure 7:
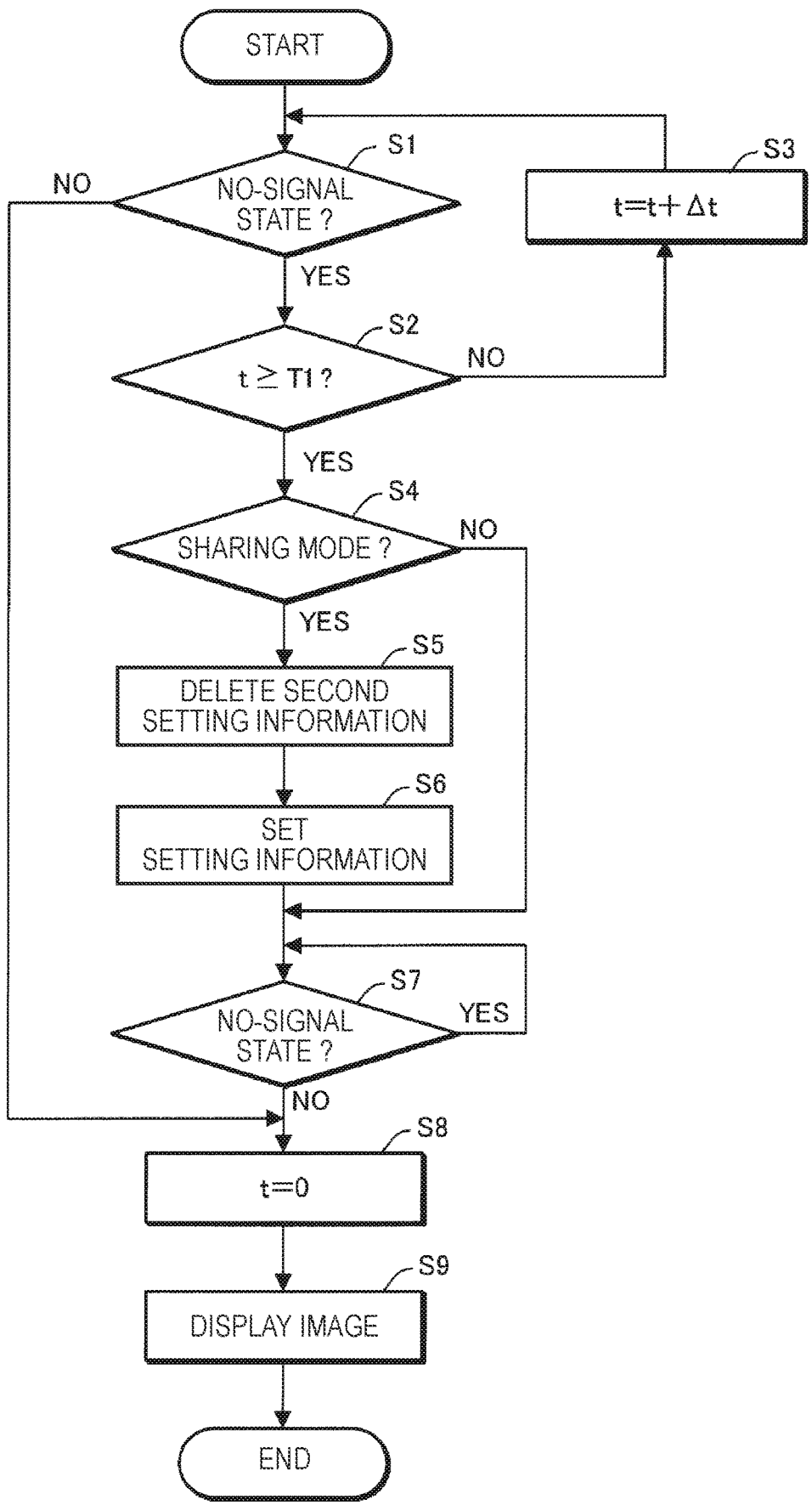
FIG. 7 is a flowchart for explaining an operation of the projector.

Then, there will be described the operation of the control section 55 changing the setting information from the second setting information to the first setting information based on the detection result of the detection section 52. FIG. 7 is a flowchart for explaining the operation. The operation shown in FIG. 7 is repeatedly performed. It should be noted that when the operation shown in FIG. 7 is started, the value of a variable t described later is set to "0."

It is conceivable that the situation in which the communication cable 200 is removed from the PC 300 to be connected to another PC than the PC 300 due to a switch between the users when, for example, the projector 100 (the control section 55) is in the first state, and the situation in which the communication cable 200 is removed from the input terminal 1, and a communication cable connected to another PC than the PC 300 is connected to the input terminal 1.

In the situation in which the communication cable 200 is removed from the input terminal 1, when the communication cable 200 is removed from the input terminal 1, the detection section 52 detects (YES in the step S1) the state (hereinafter also referred to as a "no-signal state") in which the display target image information is not input. The detection section 52 outputs detection result of the no-signal state to the control section 55.

When the control section 55 receives the detection result of the no-signal state, the control section 55 determines (step S2) whether or not the variable t representing the duration of the no-signal state is equal to or longer than the first time period T1. It should be noted that the first time period T1 is stored in, for example, the storage section 4.

In the case in which the variable t is shorter than the first time period T1 (NO in the step S2), the control section 55 adds (step S3) time Δt to the variable t, and then, the process returns to the step S1. As the time Δt, there is used the time necessary for the process in the steps S1 through S3. For example, the control section 55 measures the time necessary for the process in the steps S1 through S3, and uses the measurement result as the time Δt.

In the case in which the variable t is equal to or longer than the first time period T1 (YES in the step S2), the control section 55 refers to the operation mode storage section 44 to determine (step S4) whether or not the operation mode is the sharing mode.

In the case in which the operation mode is the sharing mode (YES in the step S4), since there is a possibility that other users have set the second setting information, the control section 55 deletes (step S5) the second setting information in the setting information storage section 42.

Subsequently, the control section 55 sets (step S6) the first setting information stored in the setting information storage section 42 to the communication section 2, the image processing section 53, and the sound processing section 54 as the setting information.

Specifically, the control section 55 sets the first setting information AA of the sound volume to the sound processing section 54 as the setting information of the sound volume. Further, the control section 55 sets the first setting information CC of the color mode to the image processing section 53 as the setting information of the color mode, and sets the first setting information EE of the keystone distortion correction value to the image processing section 53 as the setting information of the keystone distortion correction value. Further, the control section 55 sets the first setting information GG of the IP address to the communication section 2 as the setting information of the IP address.

Subsequently, the control section 55 waits (YES in the step S7) until the detection section 52 detects the display target image information. If the detection section 52 has detected (NO in the step S7) the display target image information, the control section 55 sets (resets) (step S8) the value of the variable t to "0." The image processing section 53 performs the image processing based on the setting information on the display target image information to generate the image signal, and the projection section 6 projects to display (step S9) the image corresponding to the image signal.

In contrast, in the case in which the operation mode is the exclusive mode in the step S4 (NO in the step S4), the process proceeds to the step S7. In other words, in the case in which the operation mode is the exclusive mode in the step S4, the control section 55 keeps the setting information in the second setting information. Further, if the detection section 52 has detected (NO in the step S1) the display target image information in the step S1, the control section 55 executes the step S8.

According to the projector 100 and the method of controlling the projector 100 of the present embodiment, it becomes possible to change the setting information from the second setting information having been changed to the first setting information not having been changed in the case in which the input of the display target image information has stopped due to the switching between the users. Therefore, it is possible to prevent the user from starting using the display device using the setting information changed by other users.

In the present embodiment, whether or not the setting information (the second setting information) having been changed is restored to the setting information (the first setting information) not having been changed in accordance with the operation mode.

Therefore, in the case in which the projector 100 is shared, the operation mode is set to the "sharing mode," and thus, it is possible to prevent the user from starting using the projector 100 using the setting information having been changed by other users.

Further, in the case in which the projector 100 is exclusively used by one user, the operation mode is set to the "exclusive mode," and thus, it is possible to keep the setting information having been changed even if the switching instruction is issued. Therefore, it becomes possible to prevent the one user from repeatedly performing the same change with respect to the same setting information.

MODIFIED EXAMPLES

The invention is not limited to the embodiment described above, but can variously be modified as described below, for example. Further, it is also possible to arbitrarily combine one or more modifications arbitrarily selected from the configurations of the modifications described below.

Modified Example 1

The first time period T1 is not limited to 3 seconds, but can arbitrarily be changed.

For example, in the case in which the setting information is restored from the setting information having been changed to the setting information not having been changed when detecting the suspended state of the projector 100, it is also possible to use the time (e.g., 10 minutes) for determining the suspension of the projector 100 as the first time period T1. In one example, in the case in which the projector 100 is used in the state in which the light source 11 is always put on, when the use of the projector 100 is terminated, the no-signal state continues. Therefore, in the case in which a time of 10 minutes is set as the first time period T1, it becomes possible to restore the setting information having been changed to the setting information not having been changed in accordance with the termination of the use of the projector 100. It should be noted that the time for determining the suspended state of the projector 100 is not limited to 10 minutes, but can arbitrarily be changed.

Modified Example 2

It is also possible to arrange that the longer the duration of the no-signal state becomes, the more items are restored from the setting information having been changed to the setting information not having been changed.

Figure 8:
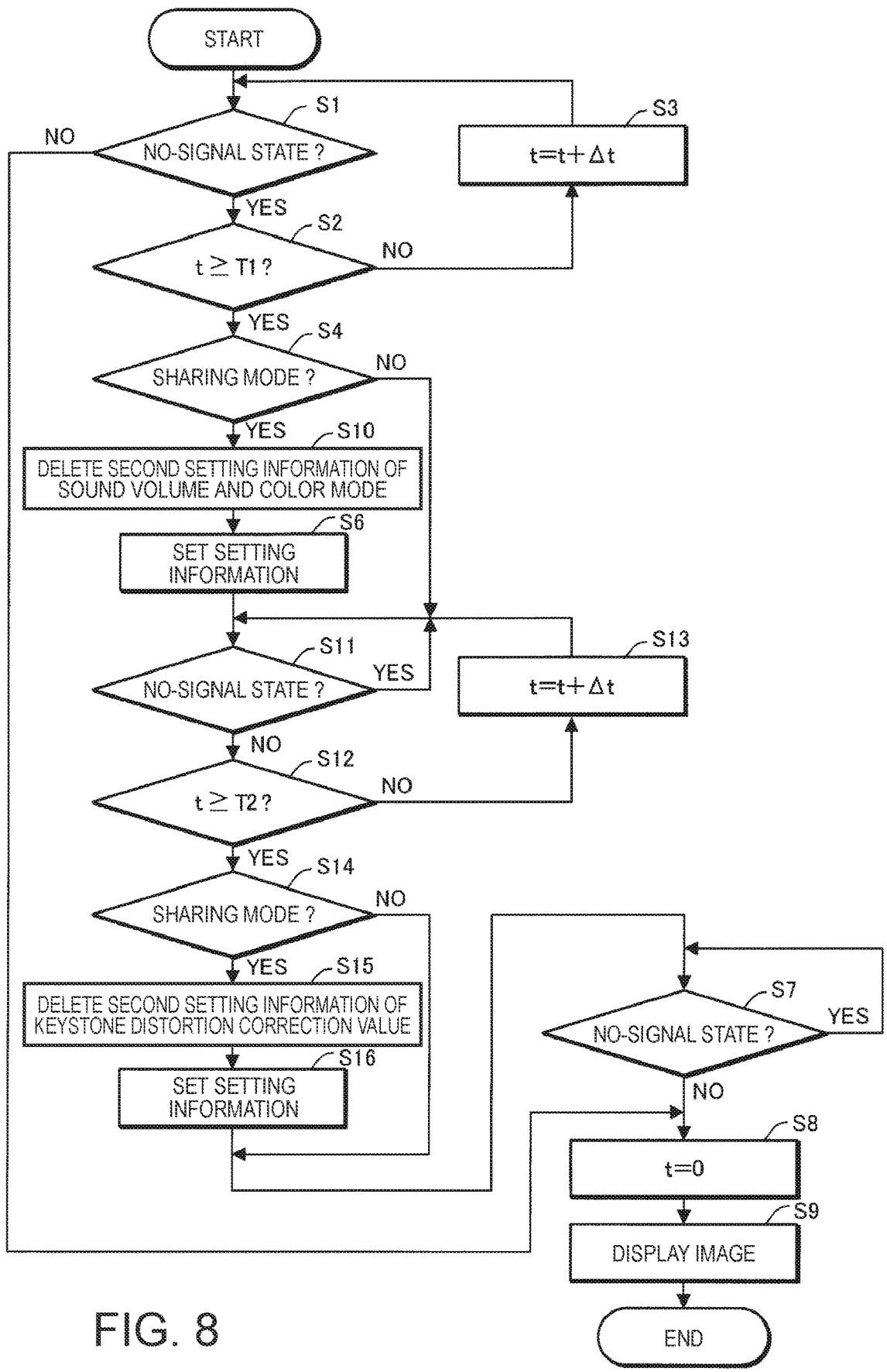
FIG. 8 is a flowchart for explaining an operation of Modified Example 2.

FIG. 8 is a flowchart for explaining an operation of Modified Example 2. Specifically, FIG. 8 is a flowchart for explaining the operation of deleting the second setting information of the sound volume and the color mode when the duration of the no-signal state reaches the first time period T1, and deleting the second setting information of the keystone distortion correction value when the duration of the no-signal state reaches a time period T2 longer than the first time period T1. The time (T2–T1) obtained by subtracting the first time period T1 from the time period T2 is an example of a second time period. The keystone correction value is an example of a first item. The sound volume and the color mode are each an example of a second item.

In Modified Example 2, the item related to the installation condition such as the keystone distortion correction value is used as the first item, and the items related to the preference of the user such as the sound volume and the color mode are used as the second item.

Therefore, the setting information of the items related to the preference of the user such as the sound volume and the color mode is firstly restored to the first setting information, and then, the setting information of the item related to the installation condition such as the keystone distortion correction value is restored to the first setting information.

The first item and the second item can arbitrarily be changed. For example, in the case in which the first setting information and the second setting information are set with respect to the luminance of the image, the item of the luminance of the image can also be used as the first item.

The first time period T1 is, for example, 3 seconds, and the time period T2 is, for example, 10 minutes. It should be noted that the first time period T1 and the time period T2 can arbitrarily be changed as long as the time period T2 is longer than the first time period T1.

In FIG. 8, the same processes as those shown in FIG. 7 are denoted by the same reference symbols. Hereinafter, Modified Example 2 will be described with a focus on differences from the processes shown in FIG. 7.

In the case of YES in the step S4, the control section 55 deletes (step S10) the second setting information of the sound volume and the second setting information of the color mode in the second setting information stored in the setting information storage section 42. In other words, the control section 55 deletes the second setting information of the sound volume and the color mode when the duration of the no-signal state reaches the first time period T1.

Subsequently, in the step S6, the control section 55 sets the first setting information of the sound volume to the sound processing section 54 as the setting information, sets the first setting information of the color mode to the image processing section 53 as the setting information, and sets the first setting information of the IP address to the communication section 2 as the setting information.

Further, in the case in which the second setting information of the keystone distortion correction value is stored in the setting information storage section 42, the control section 55 sets the second setting information of the keystone distortion correction value to the image processing section 53 as the setting information. In contrast, in the case in which the second setting information of the keystone distortion correction value is not stored in the setting information storage section 42, the control section 55 sets the first setting information of the keystone distortion correction value to the image processing section 53 as the setting information.

The steps S11 through S14 performed subsequently to the step S6 are the same in process as the steps S1 through S4. Therefore, the specific description will be omitted.

In the case of YES in the step S14, the control section 55 deletes (step S15) the second setting information of the keystone distortion correction value from the setting information storage section 42. In other words, the control section 55 deletes the second setting information of the keystone distortion correction value when the duration of the no-signal state reaches the time period T2.

Subsequently, the control section 55 sets the first setting information of the keystone distortion correction value to the image processing section 53 as the setting information. Subsequently, the steps S7 through S9 are executed.

According to Modified Example 2, it becomes possible to arrange that the longer the duration of the no-signal state is, the more items of the setting information are restored to the information not having been changed.

Modified Example 3

The timing of restoring the setting information from the second setting information to the first setting information can also be the timing at which the no-signal state is resolved.

Figure 9:
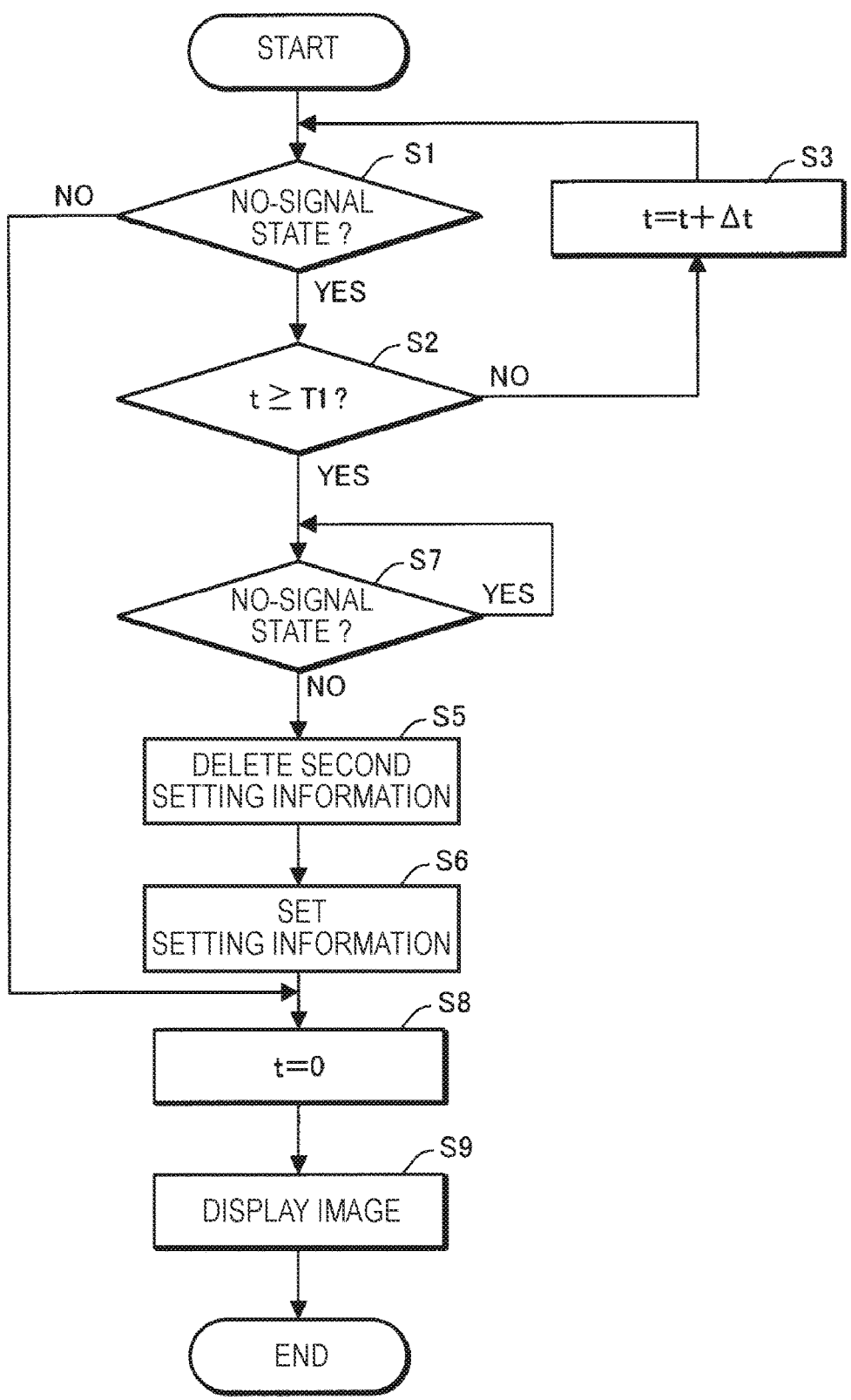
FIG. 9 is a flowchart for explaining an operation of Modified Example 3.

FIG. 9 is a flowchart showing the operation of setting the timing of restoring the setting information from the second setting information to the first setting information to the timing at which the no-signal state is resolved. In FIG. 9, the same processes as those shown in FIG. 7 are denoted by the same reference symbols. In the operation shown in FIG. 9, the step S4 is omitted, and the steps S5 and S6 are executed immediately before the step S8. In this case, it is also possible to control the image processing section 53 so that blackout (image display inhibition state) is executed while executing the steps S5 and S6.

Modified Example 4

The GUI for setting the first setting information is not limited to the first setting screen I1 shown in FIG. 4, but can arbitrarily be changed. Further, the GUI for setting the second setting information is not limited to the second setting screen I2 shown in FIG. 5, but can arbitrarily be changed.

Modified Example 5

Either one or both of the first setting information and the second setting information can also be set using a setting section different from the GUI. For example, as the setting section different from the GUI, it is possible to use the setting section for setting either one or both of the first setting information and the second setting information in accordance with an instruction transmitted from the outside.

Further, as the setting section different from the GUI, it is also possible to use a changing section for automatically updating the first setting information based on a change history of the setting information.

For example, there is a possibility that the first setting information set by the administrator as the reference value is not necessarily the setting information desired by the user. In this case, it is necessary for the user to change the setting information from the first setting information to the second setting information using the second setting screen I2 every time the user uses the projector 100. Further, in such a circumstance, it also results that the administrator changes the first setting information (the reference value) using the first setting screen I1 in response to the request from the user. Therefore, the changing operation is required for the user, and by extension, for the administrator.

In contrast, if the changing section for automatically updating the first setting information based on the change history of the setting information is used, it becomes possible to reduce the burden of the changing operation of the user, and by extension, of the administrator.

Figure 10:
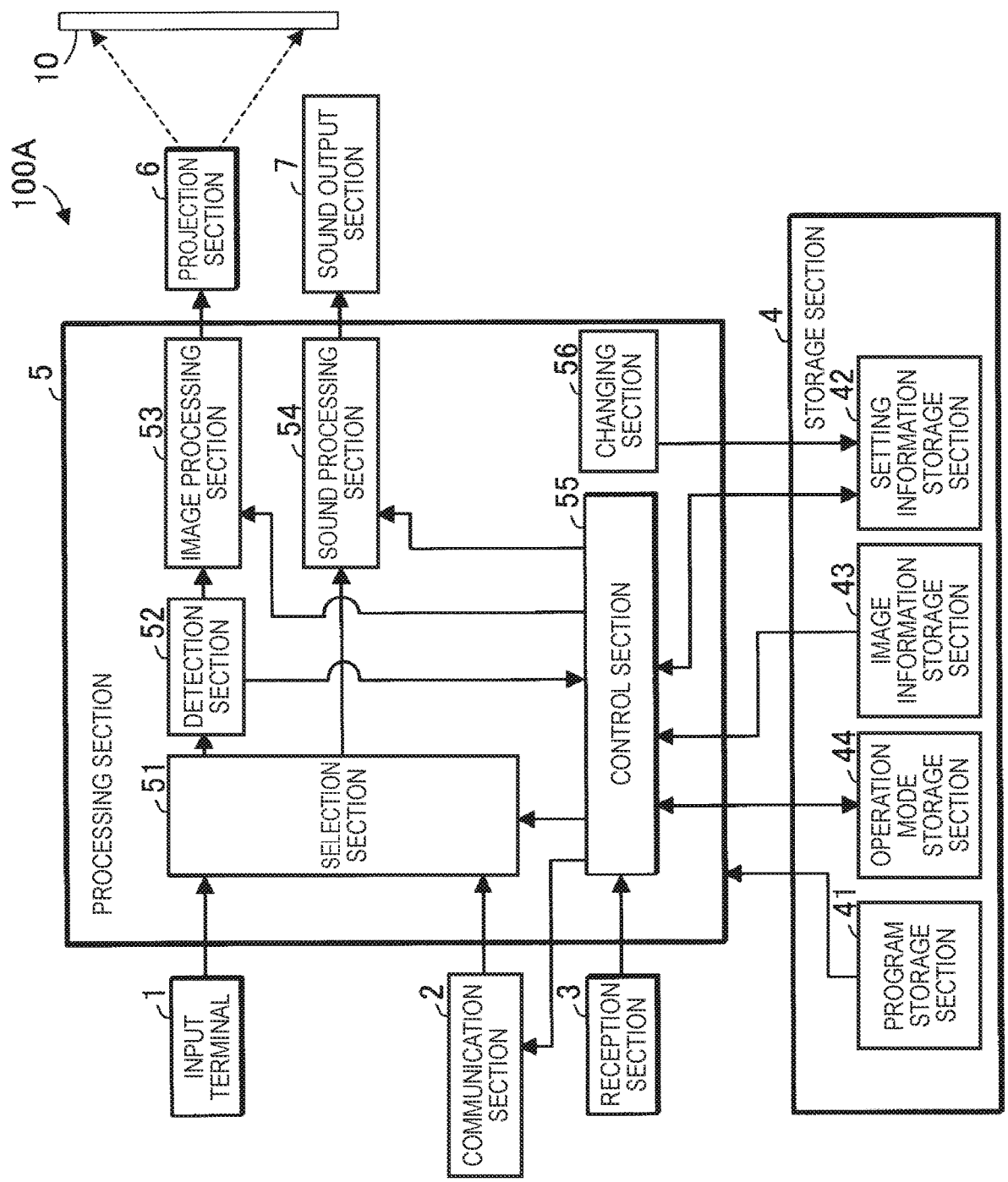
FIG. 10 is a diagram showing an example of a projector including a changing section.

FIG. 10 is a diagram showing an example of a projector 100A including the changing section 56 for changing the first setting information based on the change history of the setting information. In FIG. 10, those having the same configurations as those shown in FIG. 1 are denoted by the same reference symbols.

The changing section 56 is realized by the processing section 5 executing the program stored in the program storage section 41. The changing section 56 changes the first setting information in the case in which the frequency of changing the setting information from the first setting information to the second setting information (information different from the first setting information) exceeds a threshold value. For example, the changing section 56 changes the first setting information based on the second setting information.

In one example, the changing section 56 stores the change history of the second setting information in the storage section 4 for each of the items (see FIG. 3) of the setting information. Further, the changing section 56 also stores the history of the startup of the projector 100A in the storage section 4.

The changing section 56 refers to the change history of the second setting information and the history of the startup of the projector 100A to calculate the frequency (hereinafter referred to as a "change frequency") of changing the setting information from the first setting information to the second setting information item by item. For example, as the change frequency in n (n is an integer equal to or greater than 1) days, the changing section 56 calculates "the number of times of setting of the second setting information in n days"/"the number of times of startup of the projector 100A for n days" item by item.

Subsequently, the changing section 56 determines whether or not the change frequency exceeds a threshold value (e.g., 0.8) item by item. It should be noted that the threshold value is not limited to 0.8, but can arbitrarily be changed, and further, can individually be set item by item. Subsequently, the changing section 56 changes the first setting information of the item the change frequency of which exceeds the threshold value to, for example, an average value of the second setting information having been set in the n days. It should be noted that the first setting information having been changed is not limited to the average value of the second setting information having been set in the n days, but can arbitrarily be changed.

In the projector 100A shown in FIG. 10, since the first setting information is changed based on the information (the second setting information) having been changed, the first setting information is apt to be changed to appropriate information.

Modified Example 6

In order to limit the person allowed to set one or both of the first setting information and the second setting information, it is also possible to add a method of certifying the person allowed to set one or both of the first setting information and the second setting information. In this case, it becomes possible to limit the person allowed to operate, for example, the first setting screen I1, namely the person allowed to set and change the first setting information, to the administrator having the administrator right.

Further, in the case in which the user temporarily obtains the administrator right due to password authentication or the like, it is also possible for the control section 55 to allow the first setting information to be changed on the second setting screen I2.

In the case in which the user not provided with the administrator right performs the operation for changing the first setting information on the second setting screen I2 using the reception section 3, it is possible for the control section 55 to output dialog box image information corresponding to the dialog box showing caution to the image processing section 53 to make the projection section 6 project the dialog box. It should be noted that the content shown in the dialog box is not limited to the caution, but can arbitrarily be changed, and can also be, for example, a description that the administrator right is required. Further, it is also possible for the control section 55 to make the projection section 6 project a screen showing an authentication procedure for the administrator instead of the dialog box. In this case, the dialog box and the screen showing the authentication procedure for the administrator are each an example of a first image.

Modified Example 7

In the operation shown in FIG. 7, it is also possible to omit the step S4, and execute the step S5 when the variable t becomes equal to or longer than the first time period T1 (YES in the step S2) in the step S2. In this case, the operation mode storage section 44 can also be omitted.

Further, in the operation shown in FIG. 8, it is also possible to omit the step S4, and execute the step S10 when the variable t becomes equal to or longer than the first time period T1 (YES in the step S2) in the step S2. In this case, the operation mode storage section 44 can also be omitted.

Modified Example 8

It is also possible to omit either one of the input terminal 1 and the communication section 2. In this case, the selection section 51 is omitted, and the image information input is output to the detection section 52.

Modified Example 9

The selection section 51 can also select two or more pieces of image information as the display target image information. In this case, it is possible for the image processing section 53 to generate a superimposed image signal corresponding to a superimposed image obtained by superimposing the images respectively based on the two or more pieces of display target image information, and for the projection section 6 to project the superimposed image corresponding to the superimposed image signal on the projection surface 10.

Modified Example 10

In the projection section 6, the liquid crystal light valves are used as the light modulation device, but the light modulation device is not limited to the liquid crystal light valves, and can arbitrarily be changed. For example, it is also possible to adopt a configuration using three reflective liquid crystal panels as the light modulation device. Further, it is also possible for the light modulation device to have a configuration such as a system using a single liquid crystal panel, a system using three digital mirror devices (DMD), or a system using a single digital mirror device. In the case of using just one liquid crystal panel or DMD as the light modulation device, the members corresponding to the color separation optical system and the color combining optical system are unnecessary. Further, besides the liquid crystal panel or the DMD, any configurations capable of modulating the light emitted by the light source can be adopted as the light modulation device.

Modified Example 11

Although the projector is used as the display device, the display device is not limited to the projector, and can arbitrarily be changed. For example, the display device can also be a direct-view display (e.g., a liquid crystal display, an organic EL (electroluminescence) display, a plasma display, or a CRT (cathode ray tube) display).

Modified Example 12

Some or all of the elements realized by the processing section 5 executing the program can also be realized by hardware using an electronic circuit such as a FPGA (field programmable gate array) or an ASIC (application specific IC), or can also be realized by a cooperative operation of software and hardware.

What is claimed is:

1. A display device comprising:
an input section to which image information is externally input;
a display section adapted to display an image based on the image information on a display surface; and
a control section adapted to control the display device based on setting information related to an operation of the display device to make the display section display the image, and change the setting information from first setting information to second setting information in accordance with an instruction for changing the setting information,
wherein in a case in which the image information is not input to the input section for a predetermined first time period after the control section has started controlling the display device, based on the second setting information, to display the image based on the image information received from the input section, the control section changes the setting information from the second setting information to the first setting information.

2. The display device according to claim 1, further comprising:
a changing section adapted to change the first setting information in a case in which a frequency of changing the setting information from the first setting information to information different from the first setting information exceeds a threshold value.

3. The display device according to claim 2, wherein
the changing section changes the first setting information based on the information different from the first setting information.

4. The display device according to claim 1, wherein
the control section makes the display section display a first setting screen for setting the first setting information and a second setting screen for setting the second setting information.

5. The display device according to claim 4, wherein
the first setting screen is a screen including a partial image for setting the first setting information with respect to a first setting item and a partial image for setting the first setting information with respect to a second setting item, and
the second setting screen is a screen including a partial image for setting the second setting information with respect to the first setting item, and not including a partial image for setting the second setting information with respect to the second setting item.

6. The display device according to claim 4, wherein
the display section displays a first image on the display surface in a case in which an operation of changing the first setting information is performed in the second setting screen.

7. The display device according to claim 1, wherein
in a case in which the image information is not input to the input section for the first time period after the control section changes the setting information with respect to a first item and the setting information with respect to a second item from the first setting information to the second setting information, the control section changes the setting information with respect to the second item from the second setting information to the first setting information without changing the setting information with respect to the first item from the second setting information to the first setting information, and in a case in which the image information is not input to the input section for a second time period after the control section changes the setting information with respect to the second item from the second setting information to the first setting information without changing the setting information with respect to the first item from the second setting information to the first setting information, the control section changes the setting information with respect to the first item from the second setting information to the first setting information.

8. The display device according to claim 1, wherein
in a case in which the image information is not input to the input section for the first time period after the control section changes the setting information from the first setting information to the second setting information,
the control section changes the setting information from the second setting information to the first setting information in a case in which an operation mode of the display device is a first mode, and
the control section keeps the setting information in the second setting information in a case in which the operation mode is a second mode.

9. A method of controlling a display device having an input section to which image information is externally input, the method comprising:

displaying an image based on the image information on a display surface;

controlling the display device based on setting information related to an operation of the display device to display the image on the display surface;

changing the setting information from first setting information to second setting information in accordance with an instruction of changing the setting information; and changing the setting information from the second setting information to the first setting information in a case in which the image information is not input to the input section for a predetermined first time period after having started controlling the display device, based on the second setting information, to display the image based on the image information received from the input section.

* * * * *